United States Patent
Jha et al.

(10) Patent No.: US 12,049,007 B2
(45) Date of Patent: Jul. 30, 2024

(54) SYSTEM AND METHOD FOR ROBUST ROBOTIC MANIPULATION USING CHANCE CONSTRAINED OPTIMIZATION

(71) Applicant: Mitsubishi Electric Research Laboratories, Inc., Cambridge, MA (US)

(72) Inventors: Devesh Jha, Cambridge, MA (US); Arvind Raghunathan, Cambridge, MA (US); Yuki Shirai, Cambridge, MA (US); Diego Romeres, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 345 days.

(21) Appl. No.: 17/653,031

(22) Filed: Mar. 1, 2022

(65) Prior Publication Data
US 2023/0278197 A1    Sep. 7, 2023

(51) Int. Cl.
*B25J 9/16*    (2006.01)
*G05B 19/4155*    (2006.01)

(52) U.S. Cl.
CPC ........... *B25J 9/1605* (2013.01); *B25J 9/1671* (2013.01); *G05B 19/4155* (2013.01); *G05B 2219/50391* (2013.01)

(58) Field of Classification Search
CPC ...... B25J 9/1605; B25J 9/1671; B25J 9/1661; B25J 9/163; G05B 2219/40429
See application file for complete search history.

(56) References Cited

U.S. PATENT DOCUMENTS

| | | | | |
|---|---|---|---|---|
| 8,731,880 | B2* | 5/2014 | Todorov | G06F 30/20 |
| | | | | 703/2 |
| 11,327,449 | B2* | 5/2022 | Quirynen | G05B 13/0275 |

(Continued)

OTHER PUBLICATIONS

Hogan et al., Tactile Dexterity: Manipulation Primitives with Tactile Feedback (Year: 2020).*

(Continued)

*Primary Examiner* — Ryan Rink
(74) *Attorney, Agent, or Firm* — Gene Vinokur; Hironori Tsukamoto

(57) ABSTRACT

A robotic system for manipulating an object with a robotic manipulator is provided. The robotic system is configured to collect a digital representation of a task for manipulating the object; solve a robust control problem to optimize a sequence of control forces to be applied by the robotic manipulator to change a state of the object, where an evolution of the state of the object is governed by a stochastic complementarity system modeling the task with a predefined probability. The robust control problem optimizes a cost function to generate the sequence of control forces performing the task subject to joint chance constraints including a first chance constraint on the state of the object being manipulated and a second chance constraint on stochastic complementarily constraints modeling manipulation of the object. The robotic system is further configured to control the manipulation of the object based on the sequence of control forces.

20 Claims, 10 Drawing Sheets

(56) References Cited

U.S. PATENT DOCUMENTS

| | | | |
|---|---|---|---|
| 2007/0083290 A1* | 4/2007 | Nagasaka | B25J 9/1671 |
| | | | 318/568.11 |
| 2016/0327936 A1* | 11/2016 | Chiang | G05B 17/02 |
| 2019/0188592 A1* | 6/2019 | Berntorp | G05B 13/048 |
| 2021/0107157 A1* | 4/2021 | Bai | B25J 9/1692 |
| 2022/0187793 A1* | 6/2022 | Berntorp | G05B 19/4155 |
| 2023/0294283 A1* | 9/2023 | Jha | B25J 9/1612 |
| | | | 700/259 |

OTHER PUBLICATIONS

Hou et al, Reorienting Objects in 3D Space Using Pivoting (Year: 2019).*

* cited by examiner

SYSTEM AND METHOD FOR ROBUST ROBOTIC MANIPULATION USING CHANCE CONSTRAINED OPTIMIZATION

TECHNICAL FIELD

The invention relates generally to robotic manipulation, and more particularly to methods for robust control of robotic manipulation using chance constrained optimization using uncertainty in the manipulation model and parameters.

BACKGROUND

Contacts play a central role in all robotic manipulation tasks. While selective use of contacts can allow robots to reason about and manipulate their environment, contact-based reasoning and control tend to be challenging in every aspect. Contact models are challenging from analytical, algorithmic as well as computational aspects. As a result, very little progress has been made in principled techniques for model-based manipulation. The underlying hybrid dynamics of frictional interaction as well as uncertainty associated with frictional parameters makes efficient design of model-based controllers for manipulation challenging.

Contact modeling has been an active area of research in robotics since the last several decades. One of the most popular approaches to model contact dynamics is using linear complementarity problem (LCP). LCP models are widely used for modeling contact dynamics in academia as well as several physics simulation engines such as Bullet, ODE, Havok, and the like. The LCP-based contact models have been widely used for solving trajectory optimization problems in manipulation as well as legged locomotion. These works assume deterministic contact models to perform trajectory optimization. However, most frictional interaction systems suffer from several sources which lead to stochastic dynamics. Thus, it is important to consider uncertainty during trajectory optimization. The uncertainty in LCP-based contact models lead to stochastic complementarity constraints during optimization. The stochastic complementarity constraints tend to cause infeasibility in the underlying optimization problem.

Accordingly, there is a need of a system and a method that solves the trajectory optimization problem by accounting for the stochastic complementarity constraints during optimization.

SUMMARY

It is an object of some embodiments to provide a robotic system configured to optimize trajectories of motion of an object being manipulated by the robotic system, by optimizing a sequence of control forces acting on the object while manipulating the object.

Some embodiments are based on a recognition that frictional interaction systems suffer from several uncertainties which lead to stochastic dynamics. Thus, it is important to consider uncertainty during trajectory optimization (TO) using contact modeling of the frictional interaction systems. Modeling uncertainty in LCP-based contact models leads to Stochastic Discrete-time Complementarity System (SDLCS).

Some embodiments are based on the recognition that during optimization of the SDLCS, the effect of uncertainty on the evolution of system states should be considered to perform robust optimization of system trajectory. In absence of such a method, a robotic manipulator of a robotic system manipulating the state of the object will suffer from poor performance and the resulting robotic manipulation system could possibly fail. Currently, there are no known techniques that can perform robust optimization for dynamics models with contact dynamics which are modeled as linear complementarity systems. This makes optimization and control of robotic manipulation unreliable and difficult.

To that end, the present disclosure proposes a chance constrained optimization formulation of SDLCS for robust trajectory optimization during manipulation. To solve the optimization problem, a Mixed-Integer Quadratic Programming with Chance Constraints (MIQPCC) is formulated. The formulation considers joint chance constraints for complementarity as well as states to capture the stochastic evolution of dynamics.

In some embodiments, a Stochastic Non-Linear Model Predictive Controller (SNMPC) based on the proposed formulation is designed with complementarity constraints for robotic systems such as planar pushing system, where the SNMPC is a non-linear model predictive controller for manipulation robotic systems.

Some embodiments are based on the realization that robust trajectory optimization requires chance constraints to be imposed as hard constraints on the SDLCS. However, using the hard constraints on the SDLCS make robust trajectory optimization problem difficult to solve. To that end, one approach is to convert the hard constraints into soft constraints. The hard constraints can be converted into soft constraints by including the hard constraints into a cost function to be optimized to obtain robust trajectories to manipulate the object. Further, the SDLCS with soft constraints is subjected to expected residual minimization (ERM)-based penalty to solve the trajectory optimization problem to obtain optimized trajectories. However, the optimized trajectories obtained with soft constraints and ERM-based penalty on the SDLCS are less robust. Because a formulation of this approach does not consider the stochastic state evolution of the system during optimization.

Therefore, the robotic system of the present disclosure solves the trajectory optimization problem by imposing chance constraints as hard constraints on the SDLCS. To that end, the chance constrains are divided into two modes by relaxing the chance constraints so that violation of the chance constraints is within acceptable range. In this way, the SDLCS with hard chance constraints is optimized to obtain robust trajectories to manipulate the object.

Accordingly, one embodiment discloses a robotic system, comprising: a robotic manipulator; a processor; and a memory having instructions stored thereon that, when executed by the processor, cause the robotic manipulator to: collect a digital representation of a task for manipulating an object from an initial state to a final state. The processor is further configured to solve a robust control problem to optimize a sequence of control forces to be applied by the robotic manipulator to change a state of the object from the initial state to the final state, where an evolution of the state of the object is governed by a stochastic complementarity system modeling the task of manipulating the object with a predefined probability. The robust control problem optimizes a cost function to generate the sequence of control forces performing the task subject to joint chance constraints including a first chance constraint on the state of the object being manipulated and a second chance constraint on stochastic complementarity constraints modeling manipulation of the object by the robotic manipulator. The processor is further configured to control the manipulation of the object by applying the computed sequence of control forces changing the state of the object from the initial state to the final state.

Accordingly, another embodiment discloses a method for manipulating an object using a robotic system, the method comprising collecting a digital representation of a task for manipulating an object from an initial state to a final state. The method further comprises solving a robust control problem to optimize a sequence of control forces to be applied by the robotic manipulator to change a state of the object from the initial state to the final state, where an evolution of the state of the object is governed by a stochastic complementarity system modeling the task of manipulating the object with a predefined probability. The robust control problem optimizes a cost function to generate the sequence of control forces performing the task subject to joint chance constraints including a first chance constraint on the state of the object being manipulated and a second chance constraint on stochastic complementarity constraints modeling manipulation of the object by the robotic manipulator. The method further comprises controlling the manipulation of the object by applying the computed sequence of control forces changing the state of the object from the initial state to the final state.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

DETAILED DESCRIPTION

In the following description, for purposes of explanation, numerous specific details are set forth in order to provide a thorough understanding of the present disclosure. It will be apparent, however, to one skilled in the art that the present disclosure may be practiced without these specific details. In other instances, apparatuses and methods are shown in block diagram form only in order to avoid obscuring the present disclosure.

As used in this specification and claims, the terms "for example," "for instance," and "such as," and the verbs "comprising," "having," "including," and their other verb forms, when used in conjunction with a listing of one or more components or other items, are each to be construed as open ended, meaning that the listing is not to be considered as excluding other, additional components or items. The term "based on" means at least partially based on. Further, it is to be understood that the phraseology and terminology employed herein are for the purpose of the description and should not be regarded as limiting. Any heading utilized within this description is for convenience only and has no legal or limiting effect.

Figure 1:
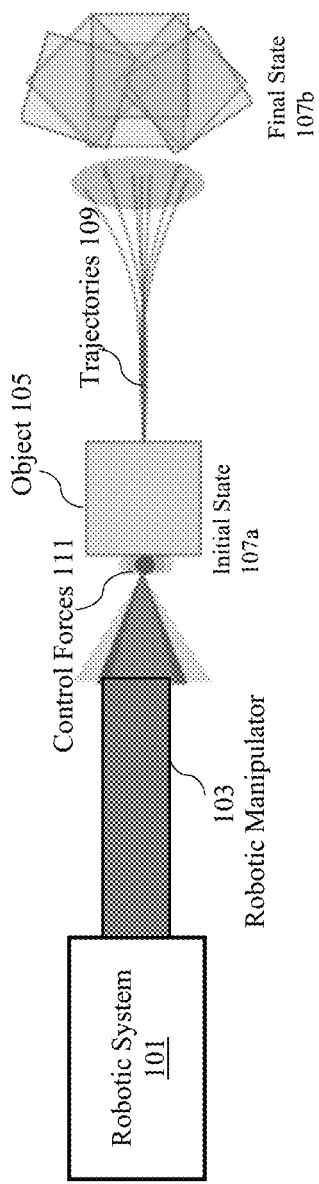
FIG. 1 illustrates a block diagram of a stochastic discrete-time linear complementarity system (SDLCS) based robotic system for manipulating an object, in accordance with an example embodiment.

FIG. 1 illustrates a block diagram of a stochastic discrete-time linear complementarity system (SDLCS) based robotic system 101 manipulating an object 105, in accordance with an example embodiment. The robotic system 101 comprises a robotic manipulator 103, where the robotic system 101 is configured to control the robotic manipulator 103 to manipulate the object 105. The manipulation of the object 105 may correspond to sliding the object 105 from an initial state (or position) 107a to a final state (position) 107b along one or more trajectories 109. To that end, the robotic system 101 is configured to determine a sequence of control forces 111 to be exerted on the object 105 via the robotic manipulator 103 such that the object 105 is moved from the initial state 107a to the final state 107b along the one or more trajectories 109. In some embodiments, the manipulation of the object 105 may correspond to grasping the object 105 at the initial state 107a and moving it to the final state 107b.

To efficiently manipulate the object 105, it is important to implement an efficient contact model that comprises interaction between contacting surfaces i.e., the robotic manipulator 103 and the object 105. The contact model comprises trajectory optimization to manipulate the object 105.

Some embodiments are based on the realization that frictional interaction systems such as the robotic system 101 configured to manipulate the object, for example, slide the object 105, suffer from several uncertainties which lead to stochastic dynamics. Thus, it is important to consider uncertainty during TO.

To that end, the SDLCS that has uncertainty in parameters and additive noises in dynamics and complementarity constraints, is implemented for contact modelling the robotic system 101. As shown in FIG. 1, uncertainty leads to stochastic evolution of system states in SDLCS. Thus, a robust optimization formulation should consider the uncertainty of SDLCS in state evolution.

The SDLCS based robotic system 101 is configured to collect a digital representation of a task for manipulating the object 105 from the initial state 107a to the final state 107b. The SDLCS governs an evolution of the task of manipulating the object 105 from the initial state 107a to the final state 107b with a predefined probability. The SDLCS includes uncertainty of interactions of the robotic manipulator 103 with the object 105. The uncertainty of the interactions in the SDLCS is caused by one or a combination of noise of evolution of the states of the object 105, noise of measurements of the states of the object 105, uncertainty of a model of the robotic manipulator 103, the uncertainty of an environment of the robotic manipulator 103, and the like. In an example embodiment, where the robotic manipulator 103 is configured to slide/push the object 105 on a surface, uncertainty of the interactions in the SDLCS is caused by the uncertainty of a friction coefficient of the surface.

The robotic system 101 is further configured to solve a robust control problem to optimize the sequence of control forces 111 to be applied by the robotic manipulator 103 to change the state of the object 105, where the robust control problem optimizes a cost function to generate the sequence of control forces 111 performing the task of manipulating the object 105 subject to chance constraints. The chance-constrained method is used to solve trajectory optimization problem under various uncertainties. It is a formulation of an optimization problem that ensures that the probability of meeting a certain constraint is above a certain level. In other words, it restricts a feasible region so that a confidence level of the solution is high. The chance-constrained method is a relatively robust approach.

To that end, the robotic system 101 is configured to solve the robust control problem using joint chance-constraints, where the joint chance constraints include a first chance constraint on the state of the object 105 being manipulated and a second chance constraint on stochastic complementarity constraint modeling manipulation of the object by the robotic manipulator 103 i.e., the stochastic complementarity constraint includes uncertainty of interactions of the robotic manipulator 103 with the object 105 being manipulated. Further, the robotic system 101 is configured to compute the sequence of control forces 111 by solving the robust control problem using the joint chance-constraints and control the manipulation of the object 105 by applying the computed sequence of control forces 111 changing the states of the object 105 from the initial state 107a to the final state 107b.

In some embodiments, the control of the manipulation of the object 105 is a feed-forward control according to the sequence of control forces 111 changing the states of the object 105 from the initial state 107a to the final state 107b. In some embodiments, the control is a feedback control updating the sequence of control forces 111 changing the state of the object 105 from the initial state 107a to the final state 107b in response to receiving a feedback signal indicative of a current state of the object 105. The feedback control is a predictive control iteratively optimizing the sequence of control forces 111 over a prediction horizon subject to hard constraints of the stochastic complementarity system.
Mathematical Implementation:

The SDLCS is based on Discrete-Time Linear Complementarity System (DLCS). Details of the DLCS is described below.

I. Discrete-Time Linear Complementarity System (DLCS)

The DLCS is a dynamical system in discrete time whose state evolution is governed by linear dynamics in states and algebraic variables that solve the LCP. The DLCS with complementarity constraints is given by:

$$I.\ x_{k+1} = Ax_k + Bu_k + C\lambda_{k+1} + g_k \quad (1)$$

$$II.\ 0 \leq \lambda_{k+1} \perp Dx_k + Eu_k + F\lambda_{k+1} + h_k \geq 0 \quad (2)$$

where k is the time-step index, $x_k \in R^{n_x}$ is the state, $u_k \in R^{n_u}$ is the control input, and $\lambda_k \in R^{n_c}$ is the algebraic variable (e.g., contact forces). In addition, $A \in R^{n_x \times n_x}$, $B \in R^{n_x \times n_u}$, $g_k \in R^{n_x}$, $D \in R^{n_c \times n_x}$, $E \in R^{n_c \times n_u}$, $F \in R^{n_c \times n_c}$, and $h_k \in R^{n_c}$. The i-th element of vector $p_k$ ($p_k$ can be $x_k$, $u_k$, $\lambda_k$) is represented as $p_{k,i}$. The i-th diagonal element of matrix $P_k$ is represented as $P_{k,ii}$. The notation $0 \leq a \perp b \geq 0$ means the complementarity constraints $a \geq 0$, $b \geq 0$, $ab = 0$. For a given $x_k$, $u_k$, an unique solution $\lambda_{k+1}$ to equation (2) exists if F is P-matrix. If F does not satisfy the P-matrix property, it is possible that $\lambda_{k+1}$ satisfying the equation (2) is non-unique or non-existent.

II. Stochastic Discrete-time Linear Complementarity Systems (SDLCS)

The SDLCS, i.e. DLCS with uncertainty is given by:

$$I.\ x_{k+1} = Ax_k + Bu_k + C\lambda_{k+1} + g_k + w_k \quad (3)$$

$$II.\ 0 \leq \lambda_{k+1} \perp y_{k+1} \geq 0 \quad (4)$$

where $y_{k+1} = Dx_k + Eu_k + F\lambda_{k+1} + h_k + v_k$. $w_k \in R^{n_x}$, $v_k \in R^{n_c}$ are known additive uncertainty. Assuming a case where the coefficient matrix C in equation (3) and F in equation (4) are stochastic matrices to discuss a more realistic stochastic effect due to complementarity constraints. This corresponds to the case where there may be an uncertainty arising from parameter identification leading to a SDLCS. An alternative to this is allowing the complementarity variable $\lambda_{k+1}$ to be stochastic. SDLCS leads to stochastic evolution of system states $x_k$. Further, it is assumed that $\lambda_{k+1}$ is a deterministic variable.

A. Robust Trajectory Optimization for SDLCS

Figure 2:
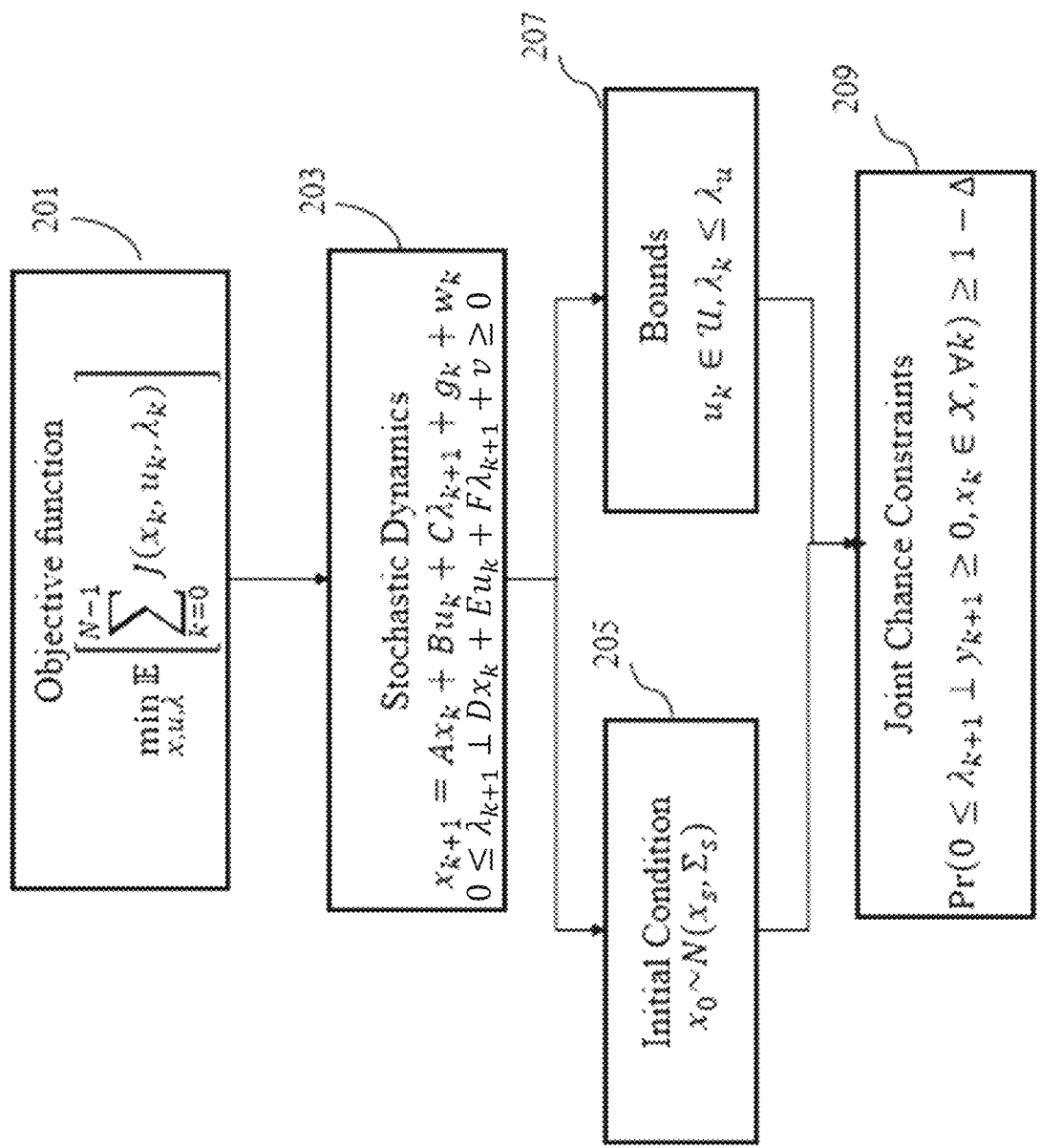
FIG. 2 illustrates robust trajectory (TO) optimization for SDLCS, in accordance with an example embodiment.

FIG. 2 illustrates a method for robust TO for SDLCS, in accordance with an example embodiment. Formulation for robust TO of SDLCS is given by an objective function 201:

$$I.\ \min_{x,u,\lambda} E\left[\sum_{k=0}^{N-1} J(x_k, u_k, \lambda_k)\right] \quad (5)$$

such that stochastic dynamics 203:

$$I.\ x_{k+1} = Ax_k + Bu_k + C\lambda_{k+1} + g_k + w_k, \quad (6)$$

is imposed with joint chance-constraints 209:

$$I.\ Pr(0 \leq \lambda_{k+1} \perp y_{k+1} \geq 0, x_k \in X, \forall k) \geq 1 - \Delta, \quad (7)$$

with initial condition 205 and bounds 207 given as:

$$I.\ x_0 \sim N(x_s, \Sigma_s), u_k \in U, \lambda_k \leq \lambda_u \quad (8)$$

where Pr denotes the probability of an event and $\Delta \in (0, 0.5]$ is the user-defined maximum violation probability, where the probability of violating constraints is bounded by $\Delta$. $x_s$, $\Sigma_s$ are the mean and covariance matrix of the state at k=0. Further, X and U are convex polytopes, consisting of a finite number of linear inequality constraints. In some embodiments, equation (7) is further converted to a tractable optimization problem.

Some embodiments are based on the following assumptions for equations (5)-(8):
1. Noise terms $w_k$, $v_k$ follow Gaussian distribution.
2. The complementarity variable $\lambda_{k+1}$ is deterministic.
3. Each element of vectors $C\lambda_{k+1}$ and $F\lambda_{k+1}$ are independent Gaussian variables.

B. Joint Linear Chance Constraints

Figure 3:
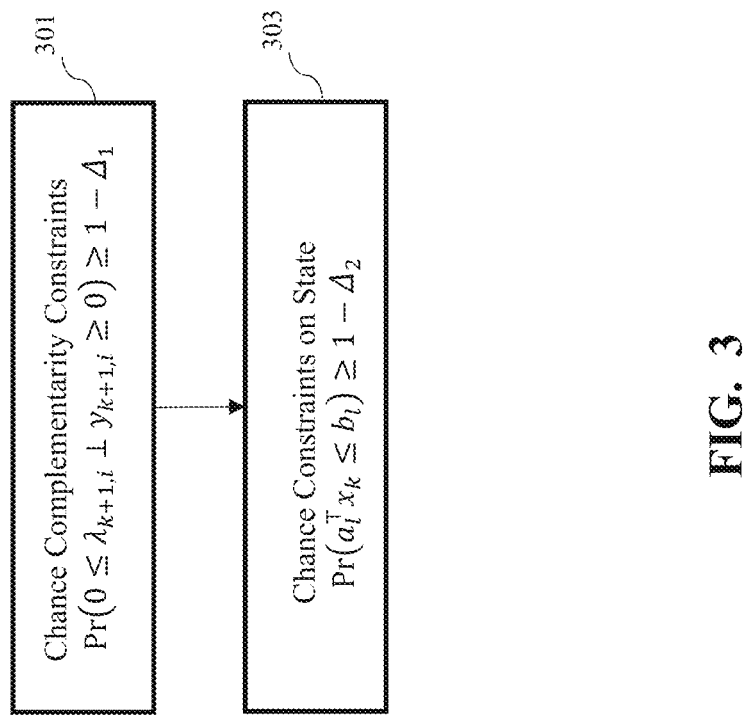
FIG. 3 illustrates a method for imposing joint linear chance constraints, in accordance with an exmaple embodiment.

Some embodiments consider joint chance constraints for states as well as complementarity. FIG. 3 illustrates steps of imposing joint linear chance constraints 301, in accordance with an example embodiment. The complementarity relationship in (4) is denoted succinctly as $(\lambda_{k+1,i}, y_{k+1,i}) \in S$, where $\lambda_{k+1,i}$ is a first complementarity variable that is deterministric and $y_{k+1,i}$ is a second complementarity variable that is probabilistic with relaxed satisfaction of inequalities dependent on deterministic values of the first complementarity variable. Hence, in the optimization problem represented in equation (5), the following joint chance constraints 301 are given by equation (9):

I. $Pr(0 \leq \lambda_{k+1} \perp y_{k+1} \geq 0, x_k \in X, \forall k) \Leftrightarrow$ (9)

$$Pr\left(\bigwedge_{k=0}^{N}\left(\bigwedge_{i=1}^{n_c}(\lambda_{k+1}, y_{k+1}) \in S\right) \wedge \left(\bigwedge_{i=1}^{L} a_l^T x_k \leq b_l\right)\right) \geq 1 - \Delta$$

where $\wedge$ and $\vee$ are the logical AND and OR operators. L represents the number of chance constraints involving x at k, except for the complementarity constraints. $a_l \in \mathbb{R}^{n_x}$ is the constant vector and $b_l$ is a scalar.

Some embodiments are based on the recognition that obtaining a cumulative distribution function (cdf) of equation (9) is challenging. Hence, at step 303 Boole's inequality is employed to get the conservative approximation of (9) as follows:

I. $Pr\left(\bigwedge_{k=0}^{N}\left(\bigwedge_{i=1}^{n_c}(\lambda_{k+1}, y_{k+1}) \in S\right)\right) \geq 1 - \Delta_1,$ (10)

$$Pr\left(\bigwedge_{k=0}^{N}\left(\bigwedge_{i=1}^{L} a_l^T x_k \leq b_l\right)\right) \geq 1 - \Delta_2,$$

$$\Delta_1 = \Delta_2 = \frac{\Delta}{2}$$

Using Boole's inequality again, the conservative chance constraints are obtained and the conservative chance constraints are given by:

I.

$$Pr((\lambda_{k+1}, y_{k+1}) \in S) \geq 1 - \frac{\Delta_1}{Nn_c},$$ (11)

$$Pr(a_l^T x_k \leq b_l) \geq 1 - \frac{\Delta_2}{NL}, \Delta_1 = \Delta_2 = \frac{\Delta}{2}$$

where $(\lambda_{k+1}, y_{k+1}) \in S$ can be represented by integer constraints in mixed integer problem (MIP). Here, if a chance constraint is formulated as one-side linear chance constraint, the one-side linear chance constraint can be converted into deterministic form. For example, $$Pr(a_l^T x_k \leq b_l) \geq 1 - \frac{\Delta_2}{NL}$$

can be converted as:

I.

$$Pr(a_l^T x_k \leq b_l) \geq 1 - \frac{\Delta_2}{NL} \Leftrightarrow$$ (12)

II.

$$a_l^T x_k \leq b_l - \sqrt{a_l^T \Sigma_{x_k} a_l} \, \Phi^{-1}\left(1 - \frac{\Delta_2}{NL}\right)$$ (13)

where $\overline{x}_k, \Sigma_{x_k}$ are the mean and covariance matrix of $x_k$, respectively. $\Phi^{-1}$ is an inverse of the cdf of the standard normal distribution.

C. Chance Complementarity Constraints (CCC) for SDLCS.

Some embodiments are based on the realization that by allowing C and F in equation (6) to be stochastic, an effect similar to stochastic complementarity variable $\lambda_{k+1}$ (the complementarity variable $\lambda_{k+1}$ is assumed to be deterministic for ease of description) is achieved in SDLCS. However, when the distribution of the $\lambda_{k+1}$ is known, the proposed formulation can be easily extended to incorporate stochastic $\lambda_{k+1}$. The Gaussian assumption on the uncertainty terms $w_k$, $v_k$ as well as $C\lambda_{k+1}$ and $F\lambda_{k+1}$ is made to use traditional Gaussian distribution-based chance constraints which have a tractable analytical form, resulting in a tractable optimization problem.

Some embodiments are based on the realization that robust trajectory optimization requires chance constraints to be imposed as hard chance constraints on the SDLCS. However, using the hard constraints on the SDLCS make robust trajectory optimization problem difficult to solve. To that end, the stochastic complementarity constraints are decomposed into two modes so that the stochastic complementarity constraints become mathematically easy or tractable.

Figure 4:
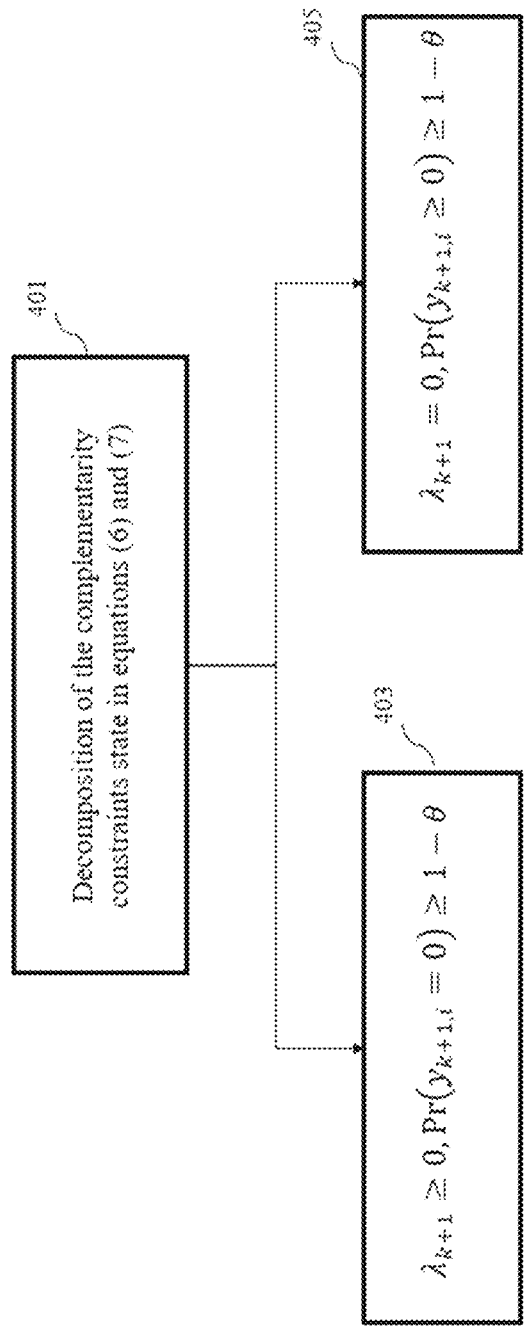
FIG. 4 illustrates decomposition of the stochastic complementarity constraints into two modes, in accordance with an example embodiment.

FIG. 4 illustrates decomposition 401 of the stochastic complementarity constraints into two modes 403 and 405, in accordance with an example embodiment. The stochastic complementarity constraints are decomposed into two disjoint modes of inequalities. The two modes: a first mode 403 (also referred to as mode 1) and a second mode 405 (in equation (16)) (also referred to as mode 2) after decomposition 401 of the stochastic complementarity constraints are as follows:

I.

$$Pr((\lambda_{k+1}, y_{k+1}) \in S) \geq 1 - \theta$$ (14)

II.

$$\Leftrightarrow Pr\left(\begin{matrix}(\lambda_{k+1,i} \geq 0, y_{k+1,i} = 0) \\ \vee \ (\lambda_{k+1,i} = 0, y_{k+1,i} \geq 0)\end{matrix}\right) \geq 1 - \theta$$ (15)

III.

$$\Leftrightarrow \begin{cases} \lambda_{k+1,i} \geq 0, Pr(y_{k+1,i} = 0) \geq 1 - \theta \\ \text{or } \lambda_{k+1,i} = 0, Pr(y_{k+1,i} \geq 0) \geq 1 - \theta \end{cases}$$ (16)

where $\theta = \frac{\Delta_1}{Nn_c}$, and $y_{k+1} \sim N\left(\overline{y}_{k+1}, \Sigma_{y_{k+1}}\right)$.

To realize lower violation probabilities, the following CCC may be used using mixed integer programming (MIP) as:

I. $z_{k,i,0} \geq 0, \Rightarrow \lambda_{k+1,i} \geq 0, Pr(y_{k+1,i} = 0) \geq 1 - \theta,$ (17)

II. $z_{k,i,1} \geq 0, \Rightarrow \lambda_{k+1,i} = 0, Pr(y_{k+1,i} \geq 0) \geq 1 - \theta$ (18)

where $z_{k,i,0}$, $z_{k,i,1}$ represent the integer variables to represent the two modes which satisfies $z_{k,i,0} + z_{k,i,1} = 1$ for i-th complementarity constraint at instant k. However, $Pr(y_{k+1,i} = 0)$ is zero (as probability measure for singleton sets is zero). Therefore, decomposed stochastic complementarity constraints stated in equations (17) and (18) cannot be directly used.

Figure 5:
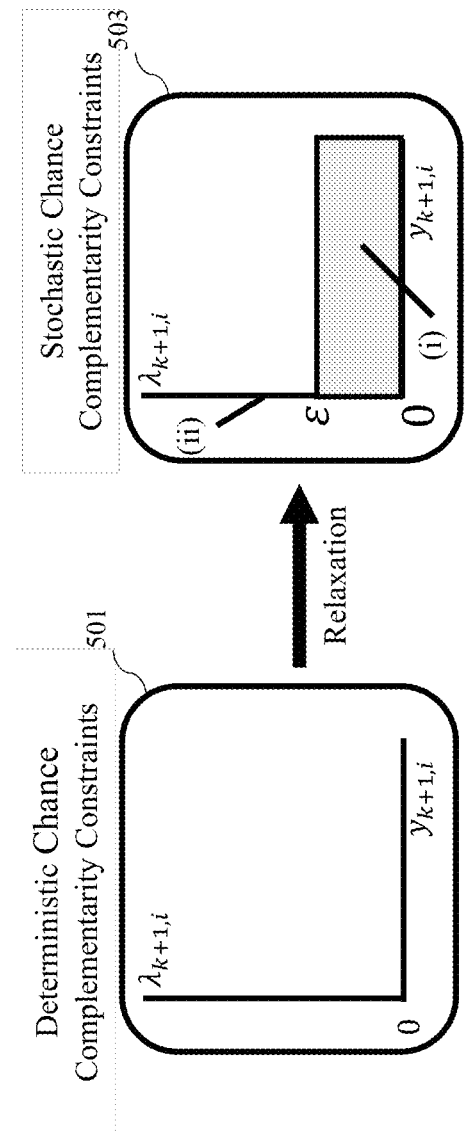
FIG. 5 illustrates relaxation of deterministic chance complementarity constraints to stochastic chance complementarity constraints, in accordance with an example embodiment.

To alleviate this issue while avoiding negative values for $\lambda$, the CCC are relaxed. FIG. 5 illustrates relaxation of deterministic 501 chance complementarity constraints to stochastic 503 chance complementarity constraints, in accordance with an example embodiment. FIG. 5 is described below in conjunction with FIG. 4. The relaxation allows the complementarity constraints $0 \leq \lambda_{k+1,i} \perp y_{k+1,i} \geq 0$, where $y_{k+1,i}$ has uncertainty to accept violation E. Further, the relaxation imposes chance constraints on occurrences of the individual modes 403 and 405. The CCC using the relaxation for complementarity constraints are given as:

$$I.\ z_{k,i,0} \geq 0, \Rightarrow \lambda_{k+1,i} \geq 0, Pr(0 \leq y_{k+1,i} \leq \varepsilon) \geq 1-\theta, \quad (19)$$

$$II.\ z_{k,i,1} \geq 0, \Rightarrow \lambda_{k+1,i} = 0, Pr(y_{k+1,i} \geq \varepsilon) \geq 1-\theta \quad (20)$$

where $\varepsilon > 0$ is the acceptable violation in the complementarity constraints.

Equation (19) represents a two-sided linear chance constraint. Therefore, equation (19) is further decomposed into two-sided chance constraints so that same reformulation as in equations (12) and (13) can be used. Each one-sided chance constraints, obtained from the two-sided chance constraint, are formulated with a maximum violation probability of $$\frac{\Delta}{2}.$$

The deterministic CCC 501 are relaxed in the equations (19)-(20) to present mathematically consistent chance constrained formulation for the equation (11).

Since the chance constraints are integer constraints, MIP can impose individual constraints for each of the two modes (equations 19 and 20). Therefore, all constraints need not be imposed simultaneously. This provides a lower bound for $\Delta$ as function of $\varepsilon$, $y_{k+1,i}$, and $\Sigma_{y_{k+1},ii}$ which is described below.

Assume that the CCC is formulated as equations (19) and (20) and $\varepsilon$, $\bar{y}_{k+1,i}$, and $\Sigma_{y_{k+1},ii}$ are specified. Then (i) equation (19) is feasibel for all $$\Delta > 2\left(1 - \Phi\left(\frac{\varepsilon}{2\sum_{y_{k+1},ii}}\right)\right)$$

and (ii) equation (20) is feasible for all $\Delta > 1 - \Phi(\bar{y}_{k+1,i} - \varepsilon)/\Sigma_{y_{k+1}ii})$. Thus, $$\theta < \frac{1}{2} \text{ if } \frac{\varepsilon}{2\sum_{y_{k+1},ii}} > \Phi^{-1}\left(\frac{3}{4}\right)$$

for case (i) and if $$(\bar{y}_{k+1,i} - \varepsilon)/\sum_{y_{k+1}ii} > \Phi^{-1}\left(\frac{1}{2}\right) \text{ for case } (ii).$$

D. Mixed-Integer Quadratic Programming with Chance Constraints

Figure 6:
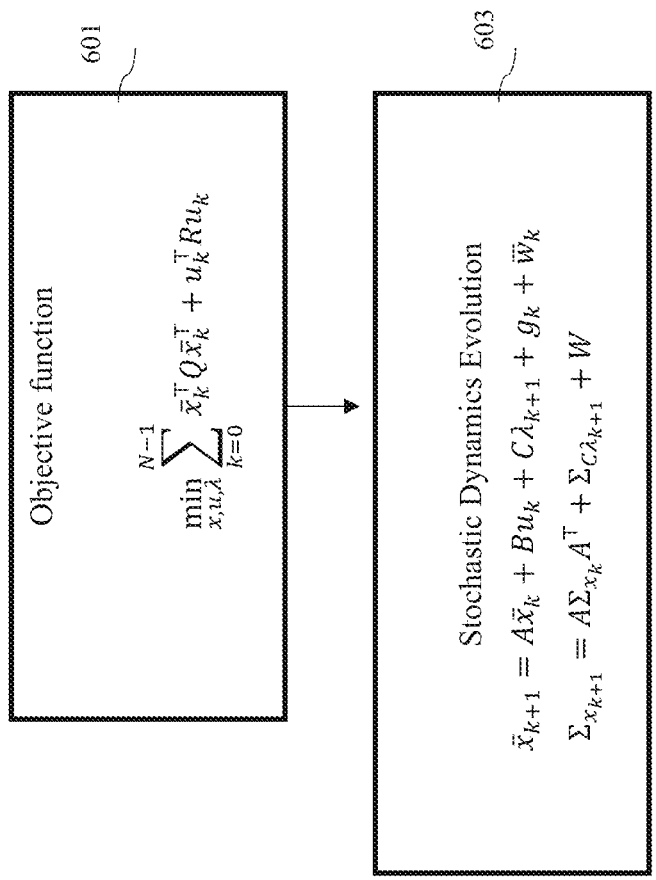
FIG. 6 illustrates an objective function and stochastic dynamics for MIQPCC, in accordance with an example embodiment.

Some embodiments are based on the realization that as the chance constraints (equation (5)-(8)) comprises a quadratic objective term, the trajectory optimization problem (i.e., the robust control problem) is solved by a Mixed Integer Quadratic Programming with Chance Constraints (MIQPCC). FIG. 6 illustrates an objective function and stochastic dynamics evolution for MIQPCC, in accordance with an example embodiment. The MIQPCC formulation to solve equations (5)-(8) may be given as follows:

I.

$$\min_{x,u,\lambda,z} \sum_{k=0}^{N-1} \bar{x}_k^T Q \bar{x}_k + u_k^T R u_k \quad (21)$$

where equation (23) is the modified objective function 601, with stochastic dynamics 603 comprising uncertainity propagation in the SDLCS is given as:

I.

such that $\bar{x}_{k+1} = A\bar{x}_k + Bu_k + \overline{C\lambda}_{k+1} + g_k + \bar{w}_k,$ (22)

II.

$$\sum\nolimits_{x_{k+1}} = A \sum\nolimits_{x_k} A^T + \sum\nolimits_{w, C\lambda_{k+1}} + W, \quad (23)$$

where $W$ represents the noise covariance matrix and $\overline{C\lambda}_{k+1}$ represents a mean of $$C\lambda_{k+1} \cdot \sum\nolimits_{C\lambda_{k+1}} = E\left[(C\lambda_{k+1} - \overline{C\lambda}_{k+1})(C\lambda_{k+1} - \overline{C\lambda}_{k+1})^T\right],$$

which is a diagonal matrix because of the independence of random variables, and where $\lambda_{k+1}$ is a decision variable. Consequently, another simplification is introduced by considering the worst-case uncertainty for $\lambda_{k+1}$ during uncertainty propagation. This conservative simplification offers computational advantages during the resulting optimization.

Further, the MIQPCC uses the initial condition and bounds as given below:

$$I.\ x_0 \sim N(x_s, \Sigma_s), u_k \in U, \lambda_k \leq \lambda_u, \quad (24)$$

$$II.\ a_l^T \bar{x}_k \leq b_l - \alpha\kappa, \quad (25)$$

$$III.\ z_{k,i,0} + z_{k,i,1} = 1, \quad (26)$$

$$IV.\ 0 \leq \lambda_{k+1,i} \leq M z_{k,i,0}, \quad (27)$$

$$V.\ \zeta\psi z_{i,k,0} + (\varepsilon + \eta\psi) z_{k,i,1} \leq \bar{y}_{k+1,i}, \quad (28)$$

$$VI.\ \bar{y}_{k+1,i} \leq (\varepsilon - \zeta\psi) z_{k,i,0} + M z_{k,i,1}, \quad (29)$$

where $$Q = Q^T \geq 0,$$

$$R = R^T > 0,$$

$$\alpha = \Phi^{-1}\left(1 - \frac{\Delta}{2NL}\right),$$

$$\zeta = \Phi^{-1}\left(1 - \frac{\Delta}{4Nn_c}\right),$$

$$\eta = \Phi^{-1}\left(1 - \frac{\Delta}{2Nn_c}\right),$$

$$\kappa = \sqrt{a_l^T \sum\nolimits_{x_k} a_l},$$

$$\psi = \sqrt{\sum\nolimits_{y_{k+1},ii}} \cdot z_{k,i,0}, z_{k,i,1}$$

are the binary decision variables for the i-th complementarity constraint at k to represent the first mode 403 and the second model 405 (FIG. 4), (shown in equation (16)) respectively. Using these binary variables, big-M formulation may be employed to deal with disjunctive inequalities in the CCC. The parameter M is a valid upper bound for $\lambda_k, y_k$.

In some embodiments, the CCC are used to design a Stochastic Non-linear Model Predictive Control (SNMPC)

for manipulation systems. A formulation to implement SNMPC for Stochastic Nonlinear Complementarity System (SNCS) is described below.

E. Stochastic Non-linear Model Predictive Control (SNMPC)

I. $x_{k+1} = f(x_k, u_k, \lambda_{k+1}) + w_k$ (30)

II. $0 \leq \lambda_{k+1} \perp y_{k+1} \geq 0$ (31)

where f ($x_k$, $u_k$, $\lambda_{k+1}$) is nonlinear dynamics.

It is an objective of some embodiments to find a control sequence to track a reference state trajectory for the SNCS. To that end, a reference trajectory x*, u*, λ*, y* is initially created by solving the optimization with deterministic complementarity constraints (no chance constraints) using Mathematical Programs with Complementarity Constraints (MPCC). Then, the stochastic dynamics are linearized along the reference trajectory which is used for uncertainty propagation.

The modified Mixed-Integer Quadratic Programming with Chance Constraints (MIQPCC) for SNMPC is given by:

I.
$$\min_{x,u,\lambda,z} x_N^{eT} Q_N x_N^e + \sum_{k=0}^{N-1} x_k^{eT} Q x_k^e + u_k^{eT} R u_k^e \quad (32)$$

II.

such that $x_{k+1}^e = A x_k^e + B u_k^e + C \lambda_{k+1}^e + \overline{w}_k$, (33)

i.

(23), (25), (26), (34)

III.

$x_0 \sim N\left(\left(x_s, \sum_s, u_k^e + u_k^* \in U, \lambda_k^e + \lambda_k^* \leq \lambda_u,\right.\right.$ (35)

IV.

$0 \leq \lambda_{k+1,i}^e + \lambda_{k+1,i}^* \leq M z_{k,i,0}$ (36)

V.

$\zeta \psi z_{i,k,0} + (\varepsilon + \eta \psi) z_{k,i,1} \leq y_{k+1,i}^e + y_{k+1,i}^*$ (37)

VI.

$y_{k+1,i}^e + y_{k+1,i}^* \leq (\varepsilon - \zeta \psi) z_{k,i,0} + M z_{k,i,1}$ (38)

where $x^e = \overline{x} - x^*$, $u^e = u - u^*$, $\lambda^e = \lambda - \lambda^*$, $y^e = \overline{y} - y^*$, $A = \frac{\partial f(x, u, \lambda)}{\partial x}|_{x^*, u^*, \lambda^*}$, $B = \frac{\partial f(x, u, \lambda)}{\partial u}|_{x^*, u^*, \lambda^*}$, $C = \frac{\partial f(x, u, \lambda)}{\partial \lambda}|_{x^*, u^*, \lambda^*}$.

The above formulation does not fix or penalize the discrete mode sequence.

Equation (36) means that $\lambda_{k+1,i} \geq 0$ if $z_{k,i,0}=1$ and $\lambda_{k+1,i}=0$ if $z_{k,i,1}=1$. Thus, the equation (36) allows deviation from the reference discrete mode sequence while satisfying complementarity constraints. Therefore, the controller may change the mode sequence from the reference. In this way, the proposed MIQPCC accounts not only for stochastic dynamics and complementarity constraint during control.

EXEMPLARY EMBODIMENTS

Figure 7:
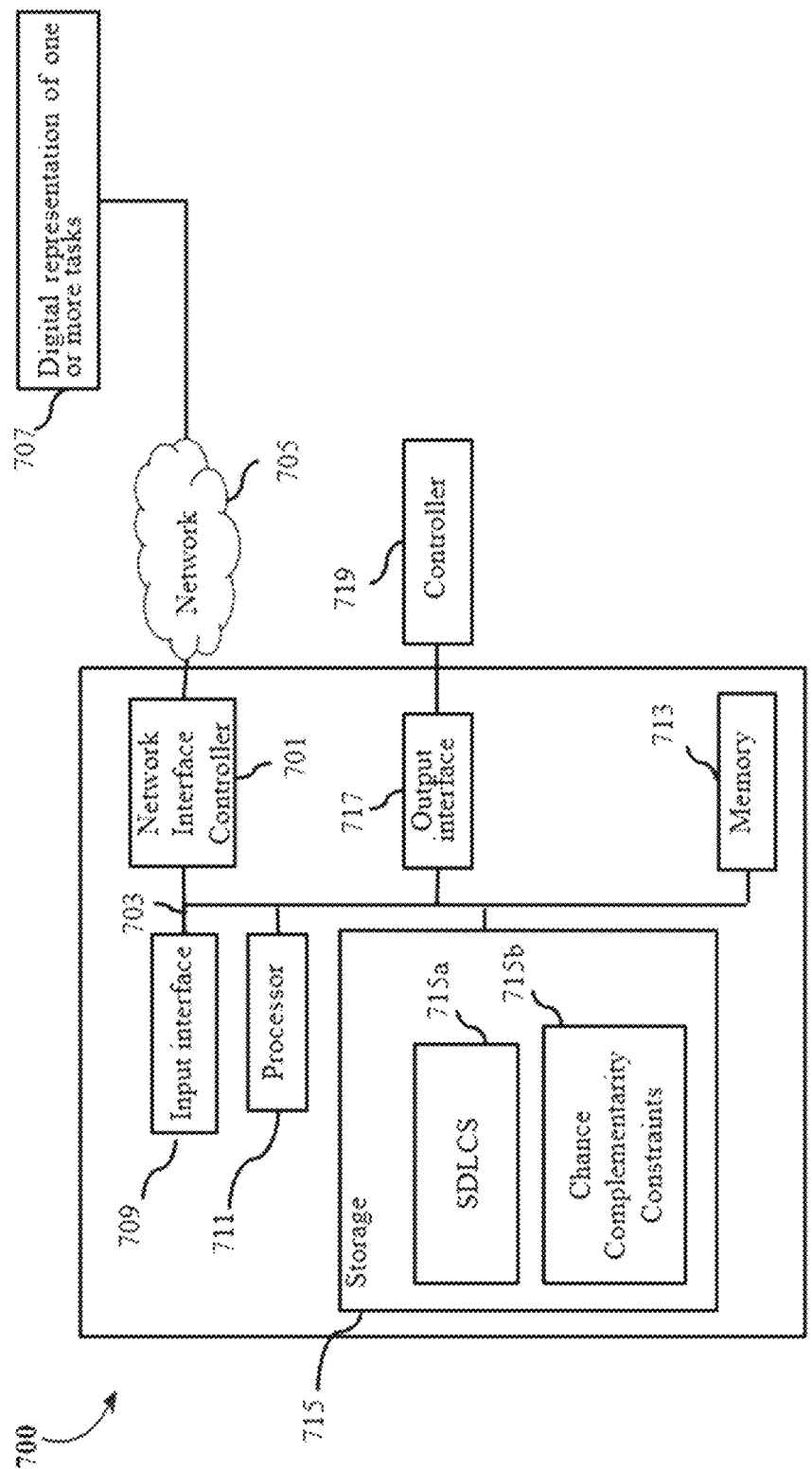
FIG. 7 illustrates a block diagram of the robotic system for manipulating the object, in accordance with an example embodiment.

FIG. 7 illustrates a block diagram 700 of the robotic system 101 for manipulating the object 105, in accordance with an example embodiment. The robotic system 101 can have a number of interfaces connecting the robotic system 101 with other systems and devices. For example, a network interface controller (NIC) 701 is adapted to connect the robotic system 101, through a bus 703, to a network 705. Through the network 705, either wirelessly or through wires, the robotic system 101 may receive the digital representation of one or more tasks 707, where the one or more tasks 707 comprises at least one of sliding the object 105 from an initial position to a final position or grasping the object 105 to move the object 105 from the initial position to the final position.

The robotic system 101 includes a processor 711 configured to execute stored instructions. The robotic system 101 further comprises a memory 713 that stores instructions that are executable by the processor 711. The processor 711 can be a single core processor, a multi-core processor, a computing cluster, or any number of other configurations. The memory 713 can include random access memory (RAM), read only memory (ROM), flash memory, or any other suitable memory systems. The processor 711 is connected through the bus 703 to one or more input and output devices. Further, the robotic system 101 includes a storage device 715 adapted to store different modules storing executable instructions for the processor 711. The storage device 715 can be implemented using a hard drive, an optical drive, a thumb drive, an array of drives, or any combinations thereof.

The storage device 715 is configured to store the SDLCS 715a and chance complementarity constraints 715b. On receiving the digital representation of the one or more tasks 707, the processor 711 is configured to solve a robust control problem to optimize a sequence of control forces to be applied by the robotic system 101 to manipulate the object, where an evolution of the states of the object is governed by SDLCS 715a that models the task of manipulating the object with a predefined probability. The processor 711 is further configured to optimize a cost function to generate the sequence of control forces performing the task subject to chance complementarity constraints 715b, where the chance complementarity constraints include a first chance constraint on the states of the object being manipulated and a second chance constraint on stochastic complementarity constraints modeling manipulation of the object. Based on the computed sequence of control forces the processor 711 is further configured to control the manipulation of the object.

Additionally, the robotic system 101 may include an output interface 717. In some embodiments, the robotic system 101 is further configured to submit, via the output interface 717, the sequence of control forces to a controller 719 configured to control a robotic manipulator to manipulate the object based on the sequence of control forces. In some embodiments, the robotic manipulator may be directly controlled by the processor 711 based on the computed sequence of control forces.

Figure 8:
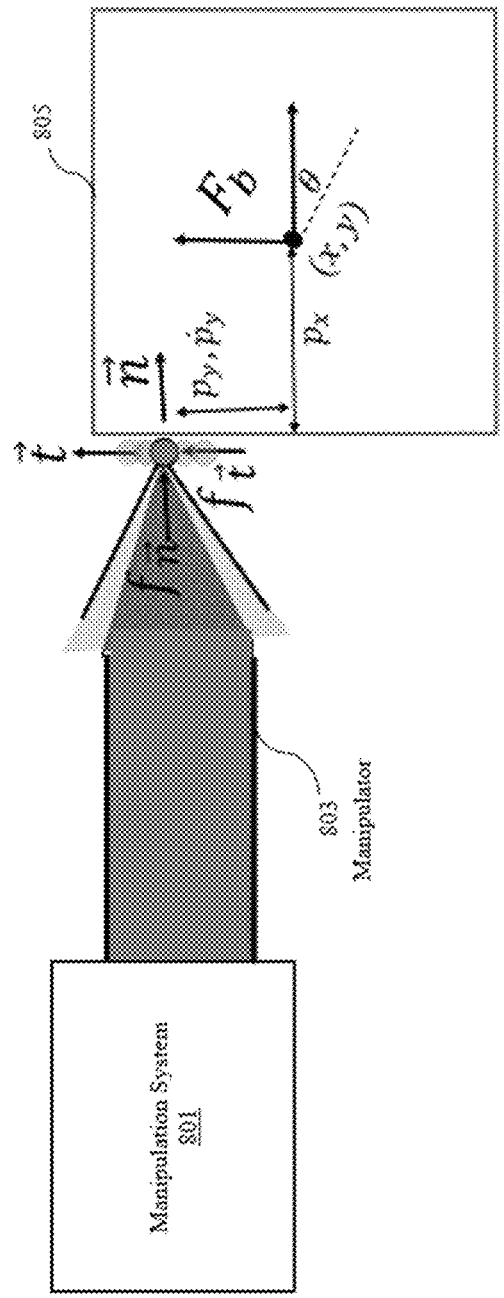
FIG. 8 illustrates a manipulation system configured to push the object using a manipulator, in accordance with an example embodiment.

FIG. 8 illustrates a manipulation system 801 configured to push the object 805 using a manipulator 803, in accordance with an example embodiment. The manipulation system 801 is based on SDLCS, where the manipulation system 801 is a pusher-slider system. Further, the manipulator 803 may correspond to pusher and slider. FIG. 8 illustrates two possible sources of uncertainty in the manipulation system 801—uncertain friction cone and the point of contact. The dynamics of the manipulation system 801 is given by:

$$I.\ \dot{x} = f(x,u) = [Rt\dot{p}_y]^T \qquad (39)$$

where R is the rotation matrix. The twist t can be obtained using an approximate limit surface for quasi-static pushing. Since the wrench applied on the manipulation system 801 depends on the point of contact of the manipulator 803, the state of the manipulation system 801 is given by $x=[x\ y\ \theta\ p_y]^T$ and the input is given by $u=[f\bar{n}\ f\bar{t}\ \dot{p}_y]^T$. The elements of the input vector must follow the laws of coulomb friction which can be expressed as complementarity conditions as follows:

$$I.\ 0 \leq p_{y+} \perp \mu_p f\bar{n} - f\bar{t} \geq 0$$

$$0 \leq \dot{p}_{y-} \perp \mu_p f\bar{n} + f\bar{t} \geq 0 \qquad (40)$$

where $\dot{p}_y = \dot{p}_{y+} - \dot{p}_{y-}$ and the $\mu_p$ is the coefficient of friction between the manipulator 803.

To solve SNMPC for the manipulation system 801 equations (32)-(38) are modified. For example, $0 \leq u_{k,i}^e + u_{k,i}^* \leq M_{z_{k,i,0}}$ is used instead of equation (36) because there are stochastic complementarity constraints on u, not on λ. Further, the stochastic complementarity constraints are relaxed to allow violation of the stochastic complementarity constraints with a probability defined by hyper parameters, where the following hyper parameters are used: μ=0.3, m=1.0. Additionally, dt=0.1 is used to discretize the dynamics and set N=10, M=20. Further, uncertainty is added in μ and dynamics for which the standard deviations are $10^{-4}$ and $4 \times 10^{-3}$, respectively.

Further, the chance constraints are predefined as follows:

$$Pr(x^* - 0.1 \leq x_{1,k} \leq x^* + 0.1) \geq 1 - \frac{\Delta}{4N},$$

$$Pr(x_{2,k} \leq 0.27) \geq 1 - \frac{\Delta}{4N}.$$

The hyperparameter is selected as a function of the predefined probability (i.e., the predefined chance constraints), such that satisfaction of the relaxed complementarity constraint with the probability defined by the hyperparameter results in a satisfaction of the stochastic complementarity system with the predefined probability. In this way, based on the modified SDLCS and chance constraints, the manipulation system 801 slides/pushes the object 805 along a predetermined trajectory using the manipulator 803.

Figure 9:
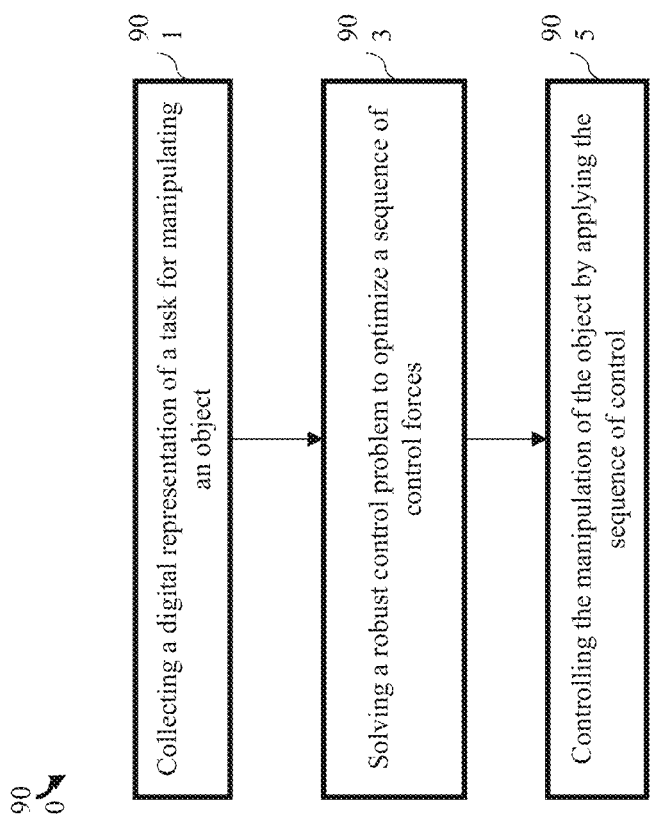
FIG. 9 illustrates steps of a method for manipulating an object using a robotic system, in accordance with an example embodiment.

FIG. 9 illustrates steps of a method 900 for manipulating an object using a robotic system 101, in accordance with an example embodiment. FIG. 9 is described below in conjunction with FIG. 1.

At step 901, a digital representation of a task such as manipulating the object 105 from an initial position to a final position is collected, where the object 105 may be manipulated using the robotic manipulator 103 of the robotic system 101. The robotic manipulator 103 applies the sequence of control forces 111 on the object 105 to manipulate the object 105. The robotic manipulator 103 is at least one of a robot wrist, gantry robots, cylindrical robots, polar robots, and jointed-arm robots equipped with an end-effector like such as a parallel jaw gripper. Further, the robotic system 101 uses SDLCS, where the SDLCS governs an evolution of the task of manipulating the object 105 from the initial state 107a to the final state 107b with a predefined probability.

At step 903, the method 900 comprises solving a robust control problem to optimize the sequence of control forces 111 to be applied by the robotic manipulator 103 to change state of the object 105. The robust control problem optimizes a cost function to generate the sequence of control forces 111 performing the task of manipulating the object 105 subject to chance constraints. The chance-constrained method is used to solve trajectory optimization problem under various uncertainties.

To that end, the method 900 comprises solving the robust control problem using joint chance-constraints, where the joint chance constraints include a first chance constraint on the states of the object 105 being manipulated and a second chance constraint on stochastic complementarity constraint modeling manipulation of the object by the robotic manipulator 103. Thus, the method 900 comprises computing the sequence of control forces 111 by solving the robust control problem using the joint chance-constraints At step 905, the method 900 comprises controlling the manipulation of the object 105 by applying the computed control forces to change the state of the object 105 from the initial state 107a to the final state 107b.

Figure 10:
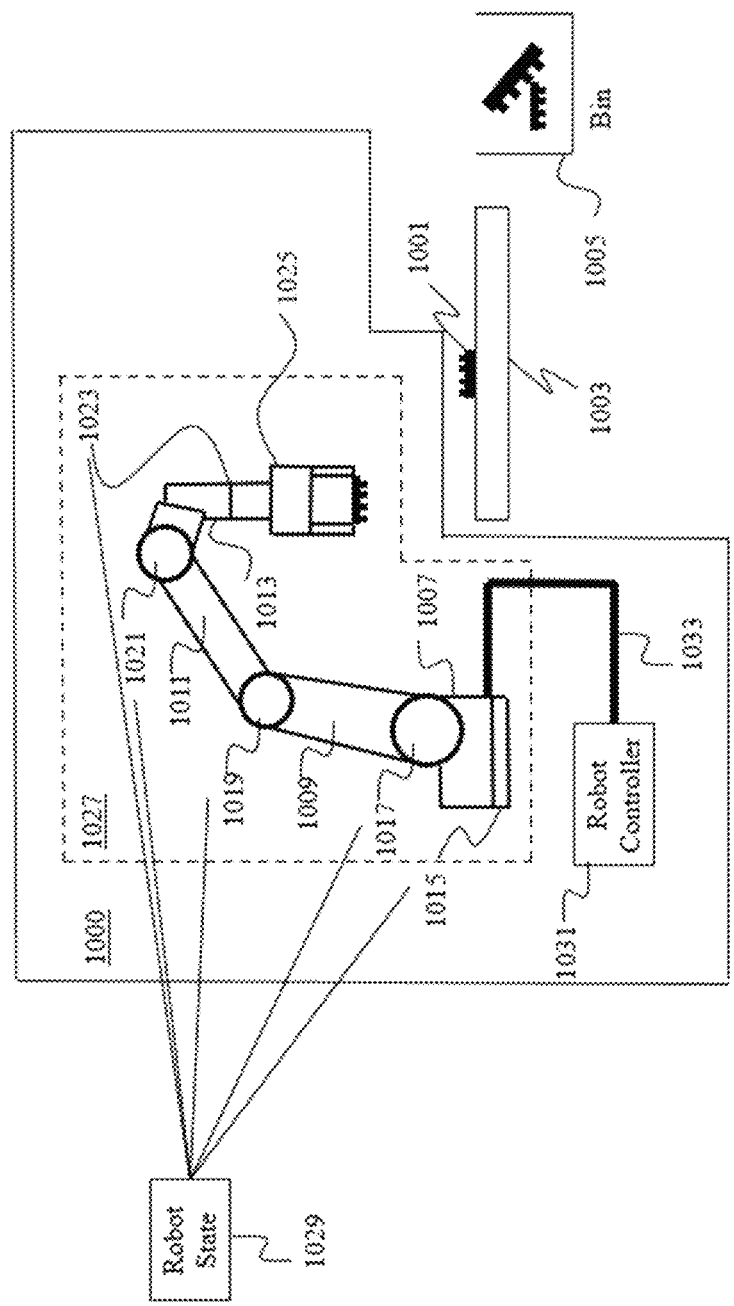
FIG. 10 illustrates a robot system configured to move an object from a working surface to a bin, in accordance with an example embodiment.

FIG. 10 illustrates a robot system 1000 configured to move an object 1001 from a working surface 1003 to a bin 1005, in accordance with an example embodiment. In this description the robot system 1000 is a set of components 1007, 1009, 1011, 1013 linked by joints 1015, 1017, 1019, 1021, 1023. In the described embodiment, the joints 1015, 1017, 1019, 1021, 1023 are revolutionary joints, but in another embodiment, they can be sliding joints, or other types of joints. The collection of joints determines the degrees of freedom for the robot arm 1027. The robot arm 1027 has five degrees of freedom, one for each joint 1015, 1017, 1019, 1021, 1023. In another embodiment the robot may contain six joints. The robot arm 1027 has an end effector 1025 attached. The end effector 1025 is attached to one of its components, typically the last component 1013 when the components are considered in a chain. An end effector 1025 could be a parallel-jaw gripper. A parallel jaw gripper has two parallel fingers whose distance can be adjusted relative to one another.

Many other end effectors can be used instead, for example an end effector which contains a welding tip. The joints 1015, 1017, 1019, 1021, 1023 can be adjusted to achieve desired configurations for the components. A desired configuration may relate to a desired position in Euclidean space, or desired values in joint space. The joints can also be commanded in the temporal domain to achieve desired (angular) velocity and/or (angular) acceleration. The joints have embedded sensors, which can report the state of the joint. The reported state may be the angle, the current, the velocity, the torque, the acceleration, or any combination thereof. The reported collection of joint states is referred to as the robot state 1029. The robot state 1029 may be used for chance constraints on stochastic complementarity constraint modeling manipulation of the object 1001 by the robotic arm 1027.

The commands for the robot arm 1027 are received from the robot controller 1031 via connection 1033, and the robot state 1029 is received by the robot controller 1031 via connection 1033. In the preferred embodiment the connection 1033 is a dedicated data cable. In another embodiment the connection 1033 is an ethernet cable. The robot controller 1031 may be configured to perform a variety of different tasks. For example, the robot controller 1031 may be configured to control the robot arm 1027 to pick the object 1001 from the working surface 1003 to be placed in the bin 1005, where the bin 1005 may be configured to collect a plurality of objects.

The robot controller 1031 uses the proposed SDLCS and chance complementarity constraints for robust trajectory optimization to move the object 1001 to the bin 1005 from the working surface 1003. To that end, the SDLCS-based robot controller 1031 initially collects a digital representation of a task of grasping the object 1001 from the working surface 1003. The working surface 1003 and the object 1001 positions and orientations may be part of the digital representation of the task. The robot controller 1031 is further configured to solve a robust control problem to optimize the sequence of control forces to be applied by the robotic controller 1031 to the robotic arm 1027 to grasp the object 1001 from the working surface 1003, where the robust control problem optimizes a cost function to generate the sequence of control forces performing the task of grasping the object 1001 subject to chance constraints.

The robot controller 1031 is further configured to solve the robust control problem using joint chance-constraints, where the joint chance constraints include a first chance constraint on the state of the object 1001 being manipulated and a second chance constraint on stochastic complementarity constraint modeling manipulation of the object by the robotic arm 1027 i.e., the stochastic complementarity constraint includes uncertainty of interactions of the robotic arm 1027 with the object 1001 being manipulated. The second chance constraints may be based on the robot states 1029. Further, the robot controller 1031 is further configured to compute the sequence of control forces by solving the robust control problem using the joint chance-constraints and control the manipulation of the object 1001 by applying the computed sequence of control forces for grasping the object 1001 and moving it from the working surface 1003 to the bin 1005.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments. Further, use of ordinal terms such as "first," "second," in the claims to modify a claim element does not by itself connote any priority, precedence, or order of one claim element over another or the temporal order in which acts of a method are performed but are used merely as labels to distinguish one claim element having a certain name from another element having a same name (but for use of the ordinal term) to distinguish the claim elements.

Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

The invention claimed is:

1. A robotic system, comprising:
a robotic manipulator;
a processor; and
a memory having instructions stored thereon that, when executed by the processor, cause the robotic manipulator to:
collect a digital representation of a task for manipulating an object from an initial state to a final state;
solve a robust control problem to optimize a sequence of control forces to be applied by the robotic manipulator to change a state of the object from the initial state to the final state, wherein an evolution of the state of the object is governed by a stochastic complementarily system modeling the task of manipulating the object with a predefined probability wherein the robust control problem optimizes a cost function to generate the sequence of control forces performing the task subject to joint chance constraints including a first chance constraint on the state of the object being manipulated and a second chance constraint on stochastic complementarity constraints modeling manipulation of the object by the robotic manipulator; and
control the manipulation of the object by applying the sequence of control forces changing the state of the object from the initial state to the final state.

2. The robotic system of claim 1, wherein the stochastic complementarily system is a stochastic discrete-time linear complementarity system (SDLCS) including uncertainty of interactions of the robotic manipulator with the object being manipulated, and wherein the complementarity constraints model interaction of the object with the sequence of control forces while manipulating the object.

3. The robotic system of claim 2, wherein the uncertainty of the interactions in the SDLCS is caused by one or a combination of noise of evolution of the state of the object, noise of measurements of the state of the object, an uncertainty of a model of the robotic manipulator, and an uncertainty of an environment of the robotic manipulator.

4. The robotic system of claim 2, wherein the robotic manipulator manipulates the object arranged on a surface, and wherein the uncertainty of the interactions in the SDLCS is caused by the uncertainty of a friction coefficient of the surface.

5. The robotic system of claim 2, wherein the robotic manipulator is at least one of a robot wrist, a gantry robot, a cylindrical robot, a polar robot, and a joint-arm robot equipped with an end-effector such as a parallel jaw gripper.

6. The robotic system of claim 1, wherein the stochastic complementarity constraints are relaxed to allow violation of the stochastic complementarity constraints with a probability defined by hyper parameters.

7. The robotic system of claim 6, wherein the hyperparameters are selected as a function of a predefined probability, such that satisfaction of the relaxed complementarity constraints with the probability defined by the hyper parameters results in a satisfaction of the stochastic complementarity system with the predefined probability.

8. The robotic system of claim 6, wherein the stochastic complementarity system comprises two complementarity variables, wherein the relaxation is imposed on individual probabilities of one or both the complementarily variables to satisfy inequalities of the complementarity constraints.

9. The robotic system of claim 8, wherein a first complementarity variable is deterministic, and a second complementarity variable is probabilistic with relaxed satisfaction of inequalities dependent on deterministic values of the first complementarity variable.

10. The robotic system of claim 6, wherein the stochastic complementarity constraints are decomposed into disjoint modes of inequalities, and wherein the relaxation imposes chance constraints on occurrences of the individual modes.

11. The robotic system of claim 1, wherein the robust control problem is solved by a mixed-integer quadratic program with chance constraints.

12. The robotic system of claim 1, wherein the control is a feed-forward control according to the sequence of control forces changing the state of the object from the initial state to the final state.

13. The robotic system of claim 1, wherein the control is a feedback control updating the sequence of control forces changing the state of the object from the initial state to the final state in response to receiving a feedback signal indicative of a current state of the object.

14. The robotic system of claim 13, wherein the feedback control is a predictive control iteratively optimizing the sequence of control forces over a prediction horizon subject to hard constraints of the stochastic complementarity system.

15. A method for manipulating an object using a robotic system, the method comprising:
collecting a digital representation of a task for manipulating an object from an initial state to a final state;
solving a robust control problem to optimize a sequence of control forces to be applied by a robotic manipulator to change states of the object from the initial state to the final state, wherein an evolution of the states of the object is governed by a stochastic complementarity system modeling the task of manipulating the object with a predefined probability, wherein the robust control problem optimizes a cost function to generate the sequence of control forces performing the task subject to joint chance constraints including a first chance constraint on the state of the object being manipulated and a second chance constraint on stochastic complementarity constraints modeling manipulation of the object by the robotic manipulator; and
controlling the manipulation of the object by applying the sequence of control forces changing the state of the object from the initial state to the final state.

16. The method of claim 15, wherein the stochastic complementarity system is a stochastic discrete-time linear complementarity system (SDLCS) including uncertainty of interactions of the robotic manipulator with the object being manipulated, and wherein the complementarity constraints model interaction of the object with the sequence of control forces while manipulating the object.

17. The method of claim 16, wherein the uncertainty of the interactions in the SDLCS is caused by one or a combination of noise of evolution of the state of the object, noise of measurements of the state of the object, uncertainty of a model of the robotic manipulator, and the uncertainty of an environment of the robotic manipulator.

18. The method of claim 16, wherein the robotic manipulator manipulates the object arranged on a surface, and wherein the uncertainty of the interactions in the SDLCS is caused by the uncertainty of a friction coefficient of the surface.

19. The method of claim 16, wherein the robotic manipulator is at least one of a robot wrist, a gantry robot, a cylindrical robot, a polar robot, and a jointed-arm robot equipped with an end-effector such as a parallel jaw gripper.

20. The method of claim 15, wherein the stochastic complementarily constraints are relaxed to allow violation of the stochastic complementarily constraints with a probability defined by a hyperparameter.

* * * * *